United States Patent [19]

Nelson et al.

[11] Patent Number: 5,821,359
[45] Date of Patent: Oct. 13, 1998

[54] ACETYLATION OF LIGNOCELLULOSIC FIBRES

[75] Inventors: Helen Louise Nelson; David Ian Richards, both of Humberside, Great Britain

[73] Assignee: A-Cell Acetyl Cellulosics AB, Partille, Sweden

[21] Appl. No.: 849,836

[22] PCT Filed: Dec. 18, 1995

[86] PCT No.: PCT/SE95/01531

§ 371 Date: Aug. 20, 1997

§ 102(e) Date: Aug. 20, 1997

[87] PCT Pub. No.: WO96/19526

PCT Pub. Date: Jun. 27, 1996

[30] Foreign Application Priority Data

Dec. 19, 1994 [GB] United Kingdom .................. 9425765

[51] Int. Cl.[6] .............................. C08H 5/04; C08B 3/06; B27K 5/00
[52] U.S. Cl. ................... 536/56; 536/69; 536/70; 536/71; 536/76
[58] Field of Search ................. 536/56, 69, 70, 536/71, 76

[56] References Cited

U.S. PATENT DOCUMENTS 3,403,145  9/1968  Edge et al. .
5,525,721  6/1996  Ohshima et al. ..................... 536/69
5,608,051  3/1997  Nelson et al. ........................ 536/76

FOREIGN PATENT DOCUMENTS 0 650 998    5/1995   European Pat. Off. .
4422356      6/1994   Germany .
264783      11/1996   New Zealand .
WO 94/09057  4/1994   WIPO .

*Primary Examiner*—Nathan M. Nutter
*Attorney, Agent, or Firm*—Burns, Doane, Swecker & Mathis, L.L.P.

[57] ABSTRACT

The invention relates to a process for acetylation of lignocellulosic fibres (LF) using an acetylating agent comprising acetic anhydride at a temperature of above 140° C. and a pressure of 100–150 kPa wherein raw or substantially raw LFs are treated with a superheated acetylating agent comprising at least 20 % w/w acetic anhydride for a duration of at least 1.5 minutes in an acetylation reactor (3), the treatment with superheated acetylating agent also ensuring that the acetylated LFs are substantially free from occluded, adsorbed or absorbed acetylating agent, the amounts of which are less than 5 % w/w of the acetylated LFs recovered from the base of a circulation cyclone (5), so as to substantially acetylate the LFs to achieve a weight gain of at least 2 %. The LFs may optionally be pre-treated, prior to being treated with the superheated acetylating agent, preferably by spraying, for a very short period of time.

24 Claims, No Drawings

ACETYLATION OF LIGNOCELLULOSIC FIBRES

This application is filed under 35USC371 as a continuation of PCT/SE95/01531 filed Dec. 18, 1995.

The present invention relates to a process for the production of acetylated lignocellulosic fibres (LF) wherein the lignocellulosic fibre is treated with acetic anhydride.

By the expression "lignocellulosic fibre" is meant here and throughout the specification a material in any shape or form such as e.g. shreds, fibres, splinters and shives, and which is derivable from a source comprising wood, sisal, jute, coconut and/or other plant material and which has optionally been subjected to a pre-treatment with a non-acetylating chemical such as e.g. sodium acetate in order to improve subsequent acetylation thereof. The material will hereafter be referred to as "LF" for convenience.

It is well known in the art to improve the physical characteristics of LFs by treatment with acetic acid and/or acetic anhydride. Processes by which LFs are treated in a single step by immersion of the LF in liquid acetic anhydride followed by heating and a drying step are known. One of the problems with systems which use the immersion technique is that they are usually batch processes which need drainage facilities for the liquid in which the LF is immersed. A single step process of this type also does not ensure acetylation of the lignocellulosic material to the desired degree nor the removal of all of the unreacted chemicals in the treated product.

It has now been found that the above problems can be mitigated by treating the LF with a vaporous acetylating agent in a single stage, if necessary, in a continuous process.

From the process described in the British application number 9322187.7 it is known to use a two step process, wherein the first step comprises treating LFs with acetic acid/acetic anhydride at a temperature of 70°–140° C. and the second step comprises treating the reaction mixture from step 1 with a superheated chemical vapour of acetic acid and/or acetic anhydride at a temperature of 140°–220° C. and a pressure of 100–150 kPa. Afterwards the LFs may optionally be purified by hydrolysis.

The known process produces, under correct operating conditions, a good product but the process is complicated and time consuming because of the need for two main treatment steps prior to the optional hydrolysis.

One object of the present invention is therefore to provide an easier and quicker process for acetylation of LFs while maintaining the necessary degree of acetylation.

This object is obtained with the process according to claims 1–10.

Accordingly, the present invention is a process for the acetylation of lignocellulosic fibres comprising bringing the LF into contact with a superheated acetylating agent comprising at least 20 % w/w acetic anhydride at a temperature above 140° C. for a duration of at least 1.5 minutes so as to substantially acetylate the LF to achieve a weight gain of at least 2%.

The superheated acetylating agent used for this purpose has at least 20% w/w, preferably above 50% w/w of acetic anhydride. The superheated acetylating agent suitably comprises 50–100% by weight, preferably 70–95% by weight of acetic anhydride. The superheated acetylating agent is at a temperature above 140° C., suitably from 140°–220° C., preferably from 160°–195° C. and the acetylation reactor is suitably operated at a pressure of 100–150 kPa.

Prior to commencement of acetylation, the acetylation reactor is suitably rendered gas-tight e.g. by using e.g. a plug screw or a rotary valve, at the point of entry into the reactor so as to minimise ingress of air into the acetylation reactor or egress of acetic anhydride out of this reactor. The superheated acetylating agent is used to start-up the process. As the concentration of acetic acid in the vapours emerging overhead from the reactor build up, such vapours can be admixed with the aliquots of acetic anhydride being superheated and can thereby restore the desired composition of the acetylating agent. The duration of this acetylation is relatively long and is usually of the order of at least 1.5 minutes, suitably at least 5 minutes, preferably up to about 10 minutes.

If desired, the LF to be acetylated may be optionally treated with a liquid acetylating agent, which may be hot or cold, for a very short period of e.g. less than a minute prior to being brought into contact with the superheated vapours of the acetylating agent. This liquid treatment step, which is much shorter than the step involving the treatment with vapours of the superheated acetylating agent, would appear to enable rapid acetylation during the actual acetylation step according to the invention. This is preferably achieved by spraying liquid and/or a mist comprising acetic anhydride on to the fibres passing through this stage without immersing such fibres in a liquid thereby achieving intimate contact between the anhydride and the fibres without using an excess of the anhydride. In this respect, the present invention is substantially different from prior art-processes in which the step involving contact with a liquid acetylating medium is considerably longer and thereby prolongs the whole of the acetylation process. This method also minimises the stages where large and bulk quantities of liquid acetylating agents are handled or processed through the reaction stages. This pre-treatment stage can be carried out in a closed system suitably operated under slightly reduced pressure in relation to atmospheric pressure in order to avoid inadvertent egress of acetic anhydride from the system.

A feature of the present invention is that the treatment of the LF with the superheated acetylating agent not only achieves the bulk of the acetylation of the fibres but also strips the acetylated LF of all excess acetylating agent or acetic acid such that the total amount of these remaining in their free occluded, adsorbed or absorbed form in the acetylated LF-but not chemically bound form-is less than 5% w/w of the acetylated LF.

The precise duration of the acetylation reaction of the LF in the reactor will be determined by the degree of acetylation desired and the nature and amount of the acetylatable material present in the LF. Thus the degree of acetylation is suitably such that the acetylated LF achieves a weight gain of at least 2%, preferably at least 5% and more preferably from 5–30% by weight.

The stripped, acetylated LF product emerging from the reactor can be further processed in a hydrolysis chamber in order to remove or at least minimise the odour of the chemicals in the acetylated LF. For instance, the stripped product which is usually at an elevated temperature of about 130°–160° C. may be dispersed and entrained in a current of steam optionally with one or more other entraining gases. It is preferable to use superheated steam and in this instance, any residual unreacted acetic anhydride remaining adsorbed or occluded in the acetylated LF is hydrolysed to acetic acid and removed overhead as a mixture of steam and acetic acid from the hydrolysis chamber. This mixed vapour may be recirculated to the superheated steam being introduced into the hydrolysis chamber. The effect of this step is that it significantly reduces the acetic acid or anhydride odour of the treated LF product by removing substantially all of the unreacted acetic anhydride therefrom and also most of the acetic acid therein. The amount of acetic acid left behind in the acetylated product is suitably less than 0.5% w/w.

The acetylated LF, after removal of any residual unreacted anhydride using superheated steam and emerging from the hydrolysis chamber, is usually at a temperature of about 150° C. This product can be sent either directly to an adjoining plant where said product can be formed into the desired shapes e.g. boards, or, can be subjected to a further humidifying and a cooling step in order to bag the material for storage and distribution. This may be achieved by passing a current of steam and air over the treated LF emerging from the hydrolysis chamber so as to cool the treated LF to about 40° C. and to humidify it.

The process of the present invention is particularly suitable for acetylating fibres, especially of wood fibres, which may vary in dimensions e.g. from 0.03 mm to 4 mm in length. Furthermore, the process of the present invention can be operated batchwise or continuously, an option not available in the conventional processes used hitherto.

The present invention is further illustrated with reference to the accompanying schematic flow diagram and the associated description below.

Raw lignocellulosic fibre (LF) is fed into a hopper (1) and via a star feeder device (in order to maintain the superheated acetylating loop gas tight) into a narrow chamber (2), purged initially with nitrogen to displace any air or oxygen therein, where the LF is sprayed with a mist of acetic anhydride at several points along its passage through the chamber (2). In this chamber (2) the LF is pre-treated with acetic anhydride by bringing the LF into intimate contact with the anhydride and thereby moistening it with acetic anhydride. This chamber (2) is maintained at a pressure slightly below atmospheric to prevent back flow of the acetic anhydride. The LF moistened with acetic anhydride and emergent from the chamber (2) is then fed to the acetylation reactor (3), also previously purged with nitrogen to exclude any air or oxygen therein, where it is brought into contact with superheated vapour of an acetylating agent containing neat acetic anhydride introduced at (4) or optionally containing some acetic acid from recycled streams at about 190° C. The pre-treated LF is entrained in the superheated vapour stream fed to the base of (3) and has a residence time in (3) of at least 1.5 minutes in order to achieve the degree of acetylation desired. Reactor (3) not only fulfils the function of acetylating the LF but is also a steam jacketed circulation stripper where the chemicals adsorbed or occluded in the acetylated LF are 15 evaporated. The overheads from the reactor (3) entraining the acetylated LF are fed into a circulation cyclone (5) where hot, acetylated LF is recovered from the base thereof and is fed through a rotary valve (not shown) into line (6). The overheads from the cyclone (5) is recirculated back to reactor (3) except for a bleed (not shown) to processing and recovering of acetic acid formed as a by-product in the acetylation step, and admixed with acetic anhydride being superheated in order to restore the desired composition of the acetylation agent. In line (6) the acetylated LF is dispersed in and entrained by a mixture of superheated steam and some acetic acid vapour (from partly recycled streams) and is then fed into a steam stripper (7). In (7), any residual, unreacted acetic anhydride in the acetylated LF is hydrolysed to acetic acid and the acetic acid is stripped out. The overheads from the steam stripper (7), which are at a temperature of about 150° C., are fed into a steam stripper cyclone (8) where the acetylated LF is separated from the vapours and recovered from the base thereof whereas the acidic vapours are recovered overhead therefrom to be processed and recycled. The acetylated LF substantially free of all free acids and anhydrides (and hence the odours of these components) recovered from the base of (8) can either be sent to an adjacent board manufacturing facility (not shown) directly or can be humidified and cooled for the purposes or bagging and storage (not shown).

The process of the present invention is further illustrated with reference to the following Example:

EXAMPLE:

A mixture of fibres of pine and spruce was brought into contact with superheated acetic anhydride (containing 5% w/w acetic acid) at 190° C. The flow rate of the anhydride was approximately 19 g per gram of fibre per minute at atmospheric pressure. The results achieved are tabulated below:

| Reaction time in minutes | Total acetyl content, %* | Content of acetylating agent, %** |
|---|---|---|
| 0 | 1.6 | — |
| 0.5 | 3.6 | 12.0 |
| 1.0 | 6.0 | 9.5 |
| 1.5 | 7.8 | 2.5 |
| 2.5 | 8.7 | 2.6 |
| 5.0 | 10.4 | 2.4 |
| 10.0 | 17.0 | 2.5 |

*Inclusive of naturally occurring acetyls
**Occluded, adsorbed or absorbed acetylating agent and acetic acid

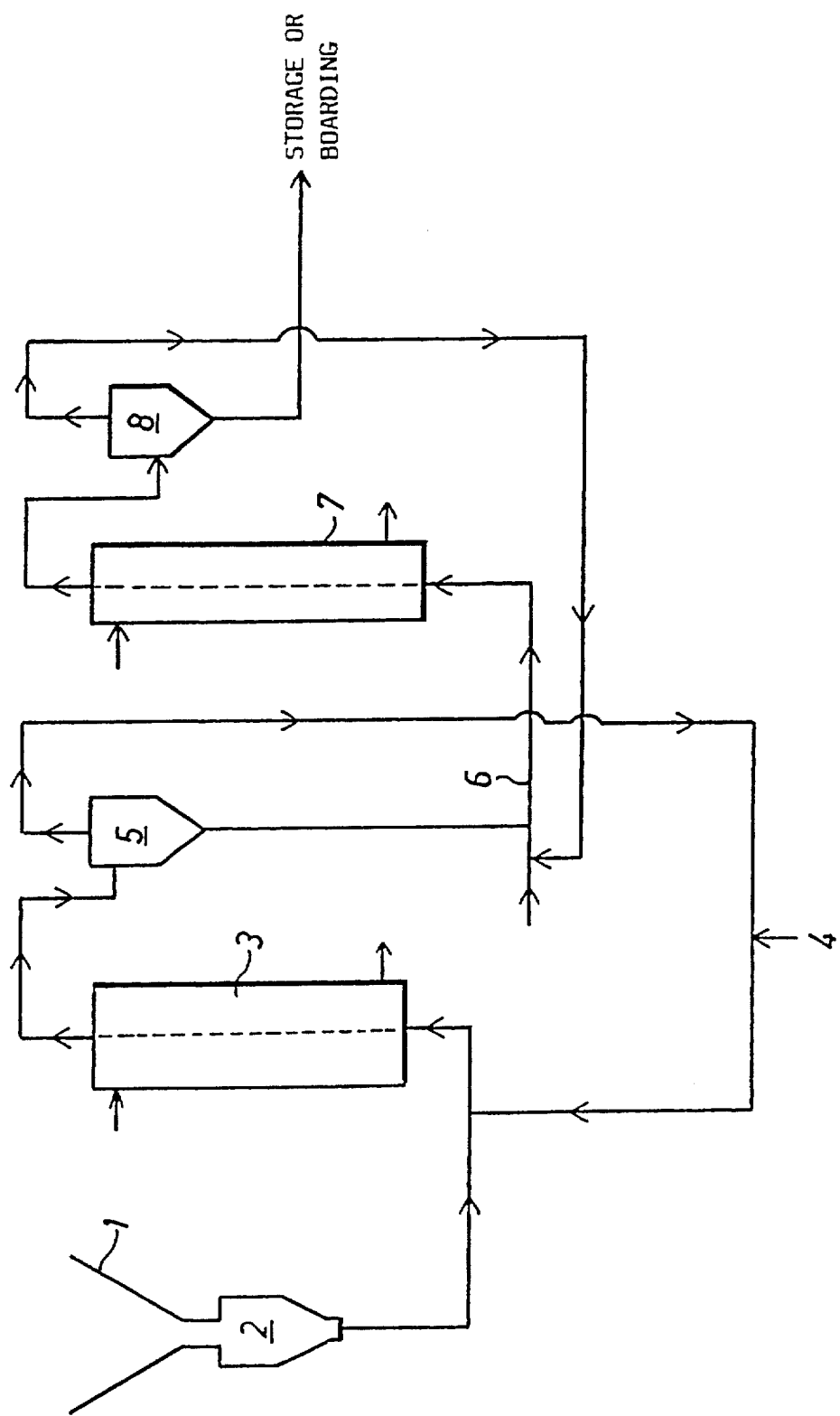

We claim:

1. A process for acetylation of lignocellulosic fibers (LF) comprising treating raw or substantially raw LFs with a superheated acetylating agent comprising at least 20% w/w acetic anhydride for a duration of at least 1.5 minutes in an acetylation reactor at a temperature of above 140° C. and a pressure of 100–150 kPa. under conditions such that acetylated LFs are produced which are substantially free from occluded, adsorbed or absorbed acetylating agent.

2. A process according to claim 1, wherein the raw or substantially raw LFs are treated with the superheated acetylating agent until the acetylated LFs achieve a weight gain of at least 2% by weight.

3. A process according to claim 1, wherein the acetylating agent comprises at least 50% w/w acetic anhydride.

4. A process according to claim 1, wherein the duration of the treatment is at least 5 minutes.

5. A process according to claim 1, wherein the acetylation is performed at a temperature of 140°–220° C.

6. A process according to claim 1, wherein the treatment is performed in a gas-tight acetylation reactor.

7. A process according to claim 1, wherein the raw or substantially raw LFs are pre-treated with a liquid acetylating agent prior to being treated with the superheated acetylating agent.

8. A process according to claim 7, wherein the pretreatment is performed in a closed system.

9. A process according claim 1, wherein the LFs are pre-treated with a catalyst.

10. A process according to claim 1, wherein the acetylated LFs emerging from the reactor are further processed in a hydrolysis chamber by contact with superheated steam, whereby any residual unreacted acetic anhydride remaining adsorbed or occluded in the acetylated LFs is hydrolysed to acetic acid and removed overhead as a mixture of steam and acetic acid from the hydrolysis chamber so that the acetic acid in the acetylated LFs is less than 0.5 % w/w, the removed mixture optionally being recirculated to the superheated steam introduced into the hydrolysis chamber.

11. A process according to claim 2, wherein the acetylating agent comprises at least 50% w/w acetic anhydride.

12. A process according to claim 2, wherein the acetylating agent comprises 70–95 % w/w acetic anhydride.

13. A process according to claim 2, wherein the duration of the treatment is at least 5 minutes.

14. A process according to claim 2, wherein the duration of the treatment is at least 10 minutes.

15. A process according to claim 2, wherein the acetylation is performed at a temperature of 140°–220° C.

16. A process according to claim 2, wherein the acetylation is performed at a temperature of 160°–195° C.

17. A process according to claim 2, wherein the treatment is performed in a gas-tight acetylation reactor.

18. A process according to claim 2, wherein the raw or substantially raw LFs are pre-treated with a liquid acetylating agent prior to being treated with the superheated acetylating agent.

19. A process according to 2, wherein the LFs are pre-treated with a catalyst.

20. A process according to claim 2, wherein the acetylated LFs emerging from the reactor are further processed in a hydrolysis chamber by contact with superheated steam, whereby any residual unreacted acetic anhydride remaining adsorbed or occluded in the acetylated LFs is hydrolysed to acetic acid and removed overhead as a mixture of steam and acetic acid from the hydrolysis chamber so that the acetic acid in the acetylated LFs is less than 0.5% w/w, the removed mixture optionally being recirculated to the superheated steam introduced into the hydrolysis chamber.

21. A process according to claim 7, wherein the pre-treatment is performed by spraying.

22. A process according to claim 8, wherein the closed system is operated under reduced pressure in relation to atmospheric pressure.

23. A process according to claim 1, wherein the raw or substantially raw LFs are treated with the superheated acetylating agent until the acetylated LFs achieve a weight gain of at least 5 %.

24. A process according to claim 1, wherein the raw or substantially raw LFs are treated with the superheated acetylating agent until the acetylated LFs achieve a weight gain of between 5 and 30% by weight.

* * * * *

UNITED STATES PATENT AND TRADEMARK OFFICE
CERTIFICATE OF CORRECTION

PATENT NO. : 5,821,359
DATED : Oct. 13, 1998
INVENTOR(S) : Nelson et al.

Page 1 of 3

It is certified that error appears in the above-identified patent and that said Letters Patent is hereby corrected as shown below:

The title page should be deleted to appear as per attached title page.

Please insert the following drawing sheet 1 of 1 as per attached.

Signed and Sealed this

Third Day of August, 1999

Attest:

Q. TODD DICKINSON

*Attesting Officer*     *Acting Commissioner of Patents and Trademarks*

United States Patent [19]

Nelson et al.

[11] Patent Number: 5,821,359

[45] Date of Patent: Oct. 13, 1998

[54] ACETYLATION OF LIGNOCELLULOSIC FIBRES

[75] Inventors: Helen Louise Nelson; David Ian Richards, both of Humberside, Great Britain

[73] Assignee: A-Cell Acetyl Cellulosics AB, Partille, Sweden

[21] Appl. No.: 849,836

[22] PCT Filed: Dec. 18, 1995

[86] PCT No.: PCT/SE95/01531

§ 371 Date: Aug. 20, 1997

§ 102(e) Date: Aug. 20, 1997

[87] PCT Pub. No.: WO96/19526

PCT Pub. Date: Jun. 27, 1996

[30] Foreign Application Priority Data

Dec. 19, 1994 [GB] United Kingdom ............... 9425765

[51] Int. Cl.$^6$ ............... C08H 5/04; C08B 3/06; B27K 5/00

[52] U.S. Cl. ............... 536/56; 536/69; 536/70; 536/71; 536/76

[58] Field of Search ............... 536/56, 69, 70, 536/71, 76

[56] References Cited

U.S. PATENT DOCUMENTS 3,403,145 9/1968 Edge et al. .

5,525,721 6/1996 Ohshima et al. ............... 536/69
5,608,051 3/1997 Nelson et al. ............... 536/76

FOREIGN PATENT DOCUMENTS

| 0 650 998 | 5/1995 | European Pat. Off. . |
| 4422356 | 6/1994 | Germany . |
| 264783 | 11/1996 | New Zealand . |
| WO 94/09057 | 4/1994 | WIPO . |

*Primary Examiner*—Nathan M. Nutter
*Attorney, Agent, or Firm*—Burns, Doane, Swecker & Mathis, L.L.P.

[57] ABSTRACT

The invention relates to a process for acetylation of lignocellulosic fibres (LF) using an acetylating agent comprising acetic anhydride at a temperature of above 140° C. and a pressure of 100–150 kPa wherein raw or substantially raw LFs are treated with a superheated acetylating agent comprising at least 20 % w/w acetic anhydride for a duration of at least 1.5 minutes in an acetylation reactor (3), the treatment with superheated acetylating agent also ensuring that the acetylated LFs are substantially free from occluded, adsorbed or absorbed acetylating agent, the amounts of which are less than 5 % w/w of the acetylated LFs recovered from the base of a circulation cyclone (5), so as to substantially acetylate the LFs to achieve a weight gain of at least 2 %. The LFs may optionally be pre-treated, prior to being treated with the superheated acetylating agent, preferably by spraying, for a very short period of time.

24 Claims, 1 Drawing Sheet